US010401799B2

(12) United States Patent
Kusuda et al.

(10) Patent No.: US 10,401,799 B2
(45) Date of Patent: Sep. 3, 2019

(54) INFORMATION PROCESSING APPARATUS, METHOD FOR CONTROLLING INFORMATION PROCESSING APPARATUS, AND RECORDING MEDIUM

(71) Applicant: Sharp Kabushiki Kaisha, Sakai, Osaka (JP)

(72) Inventors: Kohji Kusuda, Sakai (JP); Nobuhisa Nakagawa, Sakai (JP); Shigeru Kobayashi, Sakai (JP); Fumitoshi Tanoue, Sakai (JP); Tadao Ando, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 190 days.

(21) Appl. No.: 15/514,001

(22) PCT Filed: Sep. 8, 2015

(86) PCT No.: PCT/JP2015/075496
§ 371 (c)(1),
(2) Date: Mar. 24, 2017

(87) PCT Pub. No.: WO2016/052100
PCT Pub. Date: Apr. 7, 2016

(65) Prior Publication Data
US 2017/0285582 A1    Oct. 5, 2017

(30) Foreign Application Priority Data
Sep. 29, 2014    (JP) .................. 2014-199357

(51) Int. Cl.
G04G 13/02    (2006.01)
G04G 21/02    (2010.01)
(Continued)

(52) U.S. Cl.
CPC ......... *G04G 13/021* (2013.01); *G04G 21/025* (2013.01); *H04M 1/72566* (2013.01); *H04W 88/02* (2013.01)

(58) Field of Classification Search
CPC ............. G04G 13/021; G04G 21/025; H04M 1/72566; H04W 88/02
See application file for complete search history.

(56) References Cited

U.S. PATENT DOCUMENTS 5,861,866 A  *  1/1999  Inoue .................... B82Y 10/00
                                                    345/643
2011/0074558 A1 * 3/2011 Miura .................. G04G 13/021
                                                    340/309.16
(Continued)

FOREIGN PATENT DOCUMENTS

JP    2000-241573 A    9/2000
JP    2004-151037 A    5/2004
(Continued)

OTHER PUBLICATIONS

Official Communication issued in International Patent Application No. PCT/JP2015/075496, dated Oct. 20, 2015.

*Primary Examiner* — Nader Bolourchi
(74) *Attorney, Agent, or Firm* — Keating & Bennett, LLP

(57) ABSTRACT

A terminal apparatus includes an ending operation detection section for detecting that an operation to stop an audio output of an alarm has been made; and a wake-up determination section for determining, as wake-up timing of the user, timing when the operation has been detected.

8 Claims, 5 Drawing Sheets

(51) Int. Cl.
  *H04M 1/725*    (2006.01)
  *H04W 88/02*    (2009.01)

(56) References Cited

U.S. PATENT DOCUMENTS

2013/0268895 A1\*  10/2013  Yamaki ............... G06F 3/04817
                                                    715/835
2014/0172574 A1\*  6/2014   Iriyama .............. G06Q 30/0261
                                                    705/14.58
2017/0136348 A1\*  5/2017   Hattori ................... G16H 50/30

FOREIGN PATENT DOCUMENTS

| JP | 2007-166474 A | 6/2007  |
|----|---------------|---------|
| JP | 2009-177376 A | 8/2009  |
| JP | 2009-180614 A | 8/2009  |
| JP | 2012-123534 A | 6/2012  |
| JP | 2012-202825 A | 10/2012 |
| JP | 2014-173986 A | 9/2014  |

\* cited by examiner

FIG. 2

| DATE | 1/1 (MON) | 1/8 (MON) | 1/15 (MON) | 1/22 (MON) | 1/29 (MON) | 2/5 (MON) | 2/12 (MON) | ... |
|---|---|---|---|---|---|---|---|---|
| WAKE-UP TIME | 7:05 | 7:55 | 7:02 | 8:01 | 7:01 | 7:59 | 7:03 | ... |
| DETERMINATION METHOD | OPERATION TO END ALARM | END OF CHARGING | GRIPPING OF TERMINAL | LIFTING OF TERMINAL | OPERATION TO END ALARM | GRIPPING OF TERMINAL | OPERATION TO END ALARM | ... |

FIG. 3

| TIME DIFFERENCE D | D≦-15 | -15<D<15 | D≧15 |
|---|---|---|---|
| PRESENTATION INFORMATION | GOOD MORNING. ARE YOU OFF TODAY? | GOOD MORNING. IT'S FINE THIS MORNING. | GOOD MORNING. AS THE SAYING GOES, THE EARLY BIRD CATCHES THE WORM. |

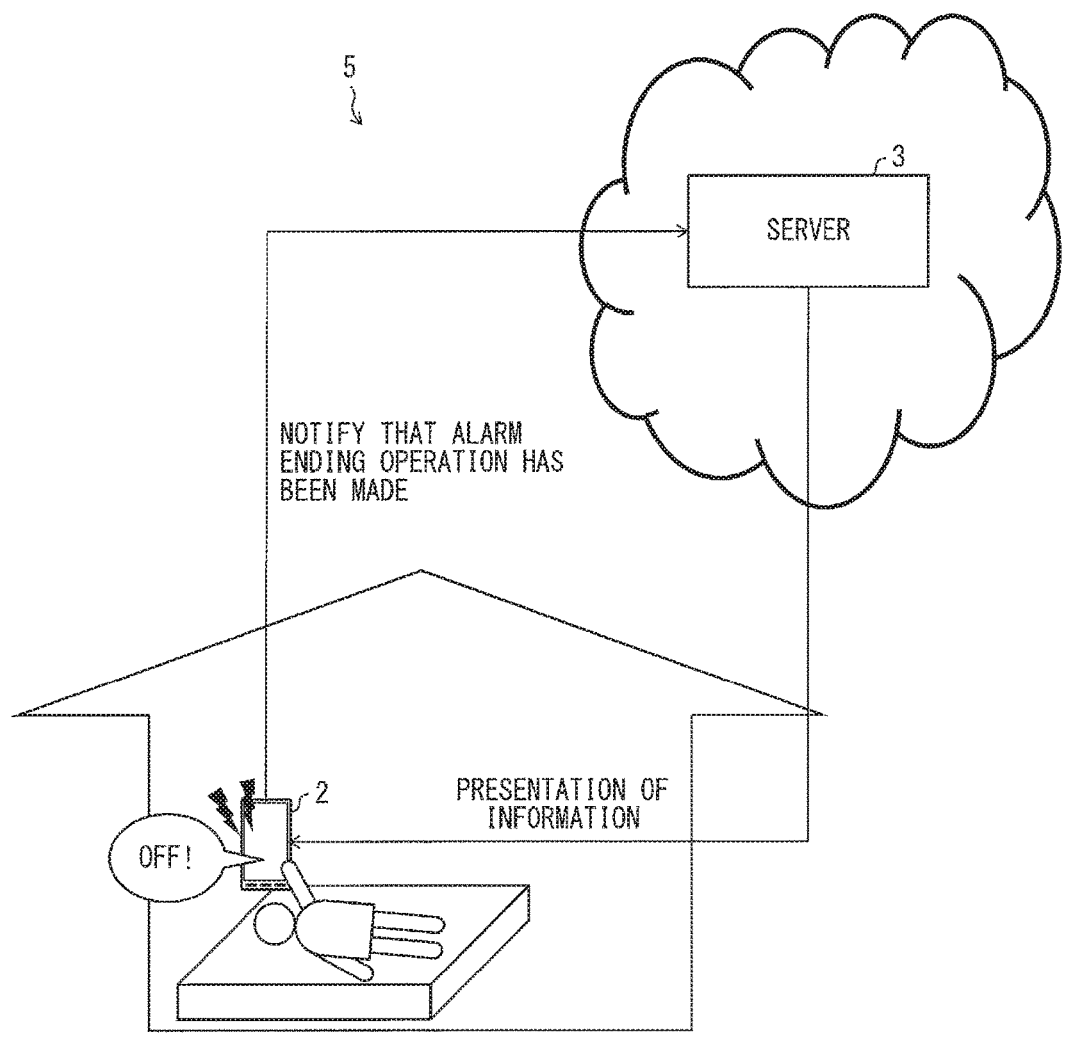

INFORMATION PROCESSING APPARATUS, METHOD FOR CONTROLLING INFORMATION PROCESSING APPARATUS, AND RECORDING MEDIUM

TECHNICAL FIELD

The present invention relates to an image processing apparatus etc. which carries out a process in accordance with a behavior of a user.

BACKGROUND ART

There has been developed a technique for causing an electronic apparatus to operate in accordance with a user's behavior. For example, Patent Literature 1 below describes a technique for determining a time when information is output to a user, based on an alarm time set by the user. Patent Literature 2 below describes a technique for changing an alarm setting time based on a time when a user made a particular behavior. Patent Literature 3 below describes a technique for providing a user with information corresponding to a behavior pattern of the user.

CITATION LIST

Patent Literature

Patent Literature 1

Japanese Patent Application Publication No. 2009-180614 (published on Aug. 13, 2009)

Patent Literature 2

Japanese Patent Application Publication No. 2009-177376 (published on Aug. 6, 2009)

Patent Literature 3

Japanese Patent Application Publication No. 2012-123534 (published on Jun. 28, 2012)

SUMMARY OF INVENTION

Technical Problem

However, in the techniques of the above patent literatures, a time to output information to a user is determined based on an alarm time, and so there is a problem that there can be a discrepancy between a time when the user actually wakes up and a time when the information is output. For example, in a case where information is output 5 minutes after an alarm time, if a user still sleeps 5 minutes after the alarm time, information is notified to the user while the user is still sleeping, and consequently there is a possibility that the user feels burdensome. In contrast, in a case where the user has already woken up and started to make some activity at a time point 5 minutes after the alarm time, there is a possibility that the information does not reach the user.

As above, the conventional technique suffers a problem that timing when a user wakes up cannot be determined with high accuracy. Such a problem cannot be solved by the technique of Patent Literature 2 in which an alarm setting time is changed and the technique of Patent Literature 3 in which information corresponding to a behavior pattern of a user is offered.

The present invention was made in view of the foregoing problem. An object of the present invention is to provide an information processing apparatus capable of determining user's wake-up timing with high accuracy.

Solution to Problem

In order to solve the foregoing problem, an information processing apparatus in accordance with an aspect of the present invention includes an operation detection section for detecting that, with respect to a notification apparatus which has been notifying a user of arrival of a preset time, an operation to stop notification by the notification apparatus has been made; and a wake-up determination section for determining, as wake-up timing of the user, timing when the operation detection section detects that the operation has been made.

In order to solve the foregoing problem, a method in accordance with an aspect of the present invention for controlling an information processing apparatus includes the steps of: (i) detecting that, with respect to a notification apparatus which has been notifying a user of arrival of a preset time, an operation to stop notification by the notification apparatus has been made; and (ii) determining, as wake-up timing of the user, timing when it is detected in the step (i) that the operation has been made.

Advantageous Effects of Invention

According to the aspects of the present invention, it is possible to yield an effect of determining user's wake-up timing with high accuracy.

BRIEF DESCRIPTION OF DRAWINGS

FIG. 2 is a view illustrating an example of a record stored in a wake-up custom DB used by the terminal apparatus.

FIG. 3 is a view illustrating an example of presentation target specifying information used by the terminal apparatus.

FIG. 5 is a view schematically illustrating a wake-up time determination system in accordance with Embodiment 2 of the present invention.

DESCRIPTION OF EMBODIMENTS

Embodiment 1

Figure 1:
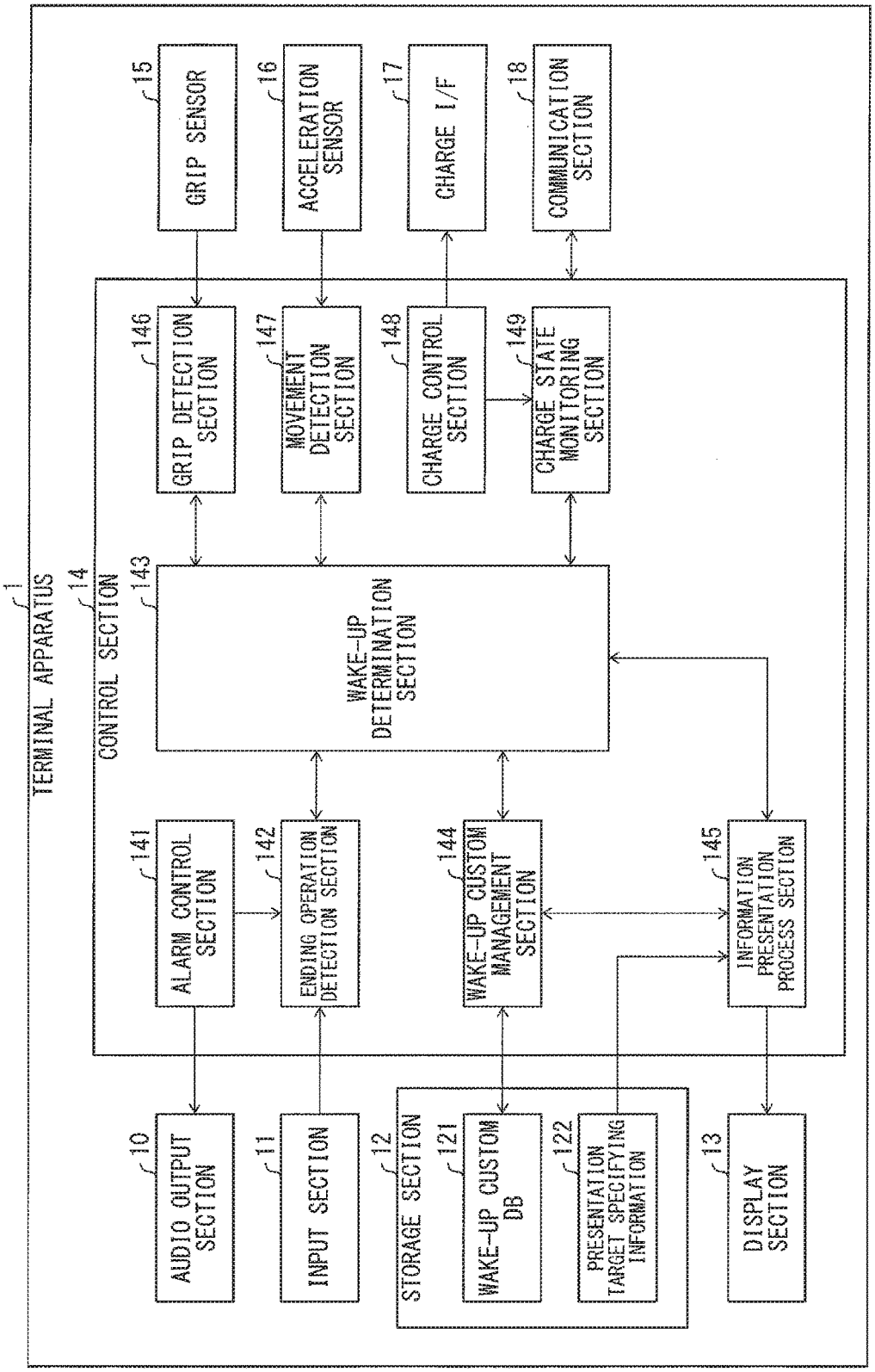
FIG. 1 is a block diagram illustrating an example of a configuration of a main part of a terminal apparatus in accordance with Embodiment 1 of the present invention.

The following description will discuss a configuration of a terminal apparatus (information processing apparatus, notification apparatus) 1 in accordance with Embodiment 1, with reference to FIG. 1. FIG. 1 is a block diagram illustrating an example of a configuration of a main part of the terminal apparatus 1. The terminal apparatus 1 is a terminal apparatus having a function of notifying a user of timing when a date and hour predetermined in advance has come. Furthermore, the terminal apparatus 1 has a function of presenting, to a user, predetermined information at timing when the user has woken up. The terminal apparatus 1 may be a mobile multifunctional terminal apparatus such as a mobile phone and a smart phone.

As illustrated in FIG. 1, the terminal apparatus 1 includes an audio output section 10, an input section 11, a storage section 12, a display section 13, a control section 14, a grip sensor 15, an acceleration sensor 16, a charge I/F 17, and a communication section 18. Furthermore, a wake-up custom DB 121 and presentation target specifying information 122 are stored in the storage section 12. The control section 14 includes an alarm control section 141, an ending operation detection section (operation detection section) 142, a wake-up determination section 143, a wake-up custom management section (normal time determination section) 144, an information presentation process section (process performing section) 145, a grip detection section (motion detection section) 146, a movement detection section (motion detection section) 147, a charge control section 148, and a charge state monitoring section (motion detection section) 149.

The audio output section 10 is an output device for outputting audio in accordance with control by the control section 14. For example, the audio output section 10 outputs an alarm sound in accordance with control by the alarm control section 141. The input section 11 is an input device for receiving a user's input operation. For example, while notification is made to a user via an alarm sound, the input section 11 receives an operation to suspend an alarm, an operation to end the alarm, and the like, and outputs the received operation to the control section 14. The storage section 12 is a storage device in which various data used by the terminal apparatus 1 is stored. The display section 13 is a display device for displaying an image in accordance with control by the control section 14. The control section 14 overall controls functions of the terminal apparatus 1. The grip sensor 15 is a sensor for detecting gripping of the terminal apparatus 1. The grip sensor 15 detects user's touching on the terminal apparatus 1 (to be more specific, user's touching on a side surface of a housing of the terminal apparatus 1), and outputs the result of the detection to the grip detection section 146. The acceleration sensor 16 is a sensor for detecting acceleration, and the acceleration detected by the acceleration sensor 16 is output to the movement detection section 147. The charge I/F 17 is an interface to which a cable for charging the terminal apparatus 1 is connected. The communication section 18 is a section via which the terminal apparatus 1 communicates with an outside apparatus.

The wake-up custom DB 121 is a database used for specifying a user's customary wake-up time (hereinafter referred to as a normal wake-up time). Records of past wake-up times etc. of the user are stored. The wake-up custom DB 121 may include data as illustrated in, for example, FIG. 2. FIG. 2 illustrates an example of a record stored in the wake-up custom DB 121.

In FIG. 2, only the record on Monday is shown. It should be noted that records on other days of the week are stored similarly. It should be also noted that the records of wake-up times stored in the wake-up custom DB 121 are only required to be those from which a normal wake-up time can be specified, and the records may be those of daily wake-up times without consideration of a difference in day. However, in general, it is often that a wake-up time varies depending on what day of the week the day is or whether the day is a weekday or holiday, and so it is preferable to record a wake-up time with sorting by day of the week or with sorting according to whether the day is weekday or holiday. Furthermore, an upper limit may be provided for the number of records in order that a user's recent custom is reflected on the normal wake-up time. For example, in a case where a period of 12 weeks is set as the upper limit, the wake-up custom management section 144 has records of wake-up times during the 12 weeks, and when a wake-up time is further recorded, the oldest record is deleted.

In the records in FIG. 2, wake-up times are stored with respect to each date. With respect to each wake-up time, information indicative of a method for determining the wake-up time is stored. For example, the wake-up time "7:05" and the determination method "operation to end an alarm" are associated with January 1. It can be specified from this that, for example, on January 1, the user woke up at 7:05 and this wake-up time is a time determined based on detection of an operation to end an output of an alarm sound. Examples of the determination method include not only "operation to end an alarm" but also "end of charging", "gripping of a terminal", "lifting of a terminal" etc., which will be detailed later.

The presentation target specifying information 122 is information used to present, to a user, information corresponding to a difference between the normal wake-up time and the user's wake-up time on the day. The presentation target specifying information 122 may be information as illustrated in, for example, FIG. 3. FIG. 3 is a view illustrating an example of the presentation target specifying information 122.

The presentation target specifying information 122 in FIG. 3 is information in which presentation information corresponding to a difference D between the user's normal wake-up time and the user's wake-up time on the day (normal wake-up time−wake-up time on the day) is shown. Specifically, as presentation information for a case where the difference D is no greater than −15 minutes, i.e. a case where the user's wake-up time on the day is later by 15 minutes or more than the normal wake-up time, a combination of morning greeting and a message asking whether the day is a user's holiday or not is stored. As presentation information for a case where the difference D is greater than −15 minutes and less than +15 minutes, i.e. a case where the difference between the user's wake-up time on the day and the normal wake-up time is less than minutes, a combination of morning greeting and a message indicating weather on the day is stored. As presentation information for a case where the difference D is +15 minutes or more, i.e. a case where the user's wake-up time on the day is earlier by 15 minutes or more than the normal wake-up time, a combination of morning greeting and a message regarding early rising is stored.

Consequently, in a case where the user's wake-up time is near the normal wake-up time (−15<D<15), a normal message is presented. On the other hand, in a case where the user's wake-up time is earlier than the normal wake-up time (+15 D), a message corresponding to a situation that the user woke up earlier than usual is presented, and in a case where the user's wake-up time is later than the normal wake-up time (D≤−15), a message corresponding to a situation that the user woke up later than usual is presented. Accordingly, it is possible to present a suitable message corresponding to the user's situation. Information indicative of weather on the day can be obtained by communications via the communication section 18, e.g. by accessing the Internet.

The alarm control section 141 receives setting of an alarm and controls an output of an alarm sound. Specifically, the alarm control section 141 receives an input of date and time when an alarm sound is to be output, and causes the input date and time to be stored. Then, at the stored time on the stored date, the alarm control section 141 causes the audio output section 10 to output a predetermined alarm sound. Instead of the date and time, an alarm may be set based on a combination of day of the week and a time or a combination of the type of date and a time, such as a particular time on weekday and a particular time on holiday. The alarm control section 141 may be realized by installing application software having such a function into the terminal apparatus 1.

The ending operation detection section 142 detects that an operation to stop an output of the alarm sound has been made to the input section 11. Specifically, the ending operation detection section 142 detects that a suspending operation to temporarily suspend the output of the alarm sound has been made. Furthermore, the ending operation detection section 142 detects that an operation to end the output of the alarm sound has been made. Upon detection of these operations, the ending operation detection section 142 notifies the wake-up determination section 143 of the detection. It should be noted that detection of the suspending operation is not essential, and the present invention may be arranged such that only the ending operation is detected.

The wake-up determination section 143 determines whether the user has woken up or not. When determining that the user has woken up, the wake-up determination section 143 determines the user's wake-up time (user's wake-up timing). Furthermore, when determining that the user has woken up, the wake-up determination section 143 notifies the information presentation process section 145 of the specified wake-up time. The method for determining whether the user has woken up or not and the method for determining the user's wake-up time will be described later.

The wake-up custom management section 144 causes the user's wake-up times specified by the wake-up determination section 143 etc. to be stored as records of the user's wake-up times in the wake-up custom DB 121. Furthermore, the wake-up custom management section 144 specifies the normal wake-up time of the user based on the records of the user's wake-up times stored in the wake-up custom DB 121. The method for specifying the normal wake-up time of the user will be described later.

The information presentation process section 145 carries out a process of presenting predetermined information to a user at the user's wake-up timing determined by the wake-up determination section 143. Furthermore, in a case where the wake-up custom management section 144 has specified the normal wake-up time of the user, the information presentation process section 145 refers to the presentation target specifying information 122 to present information corresponding to the normal wake-up time. Here, a description is made as to an example in which the predetermined information is in a text and the text is displayed on the display section 13 so as to be presented to the user. However, the present invention is not particularly limited in terms of how information is presented, and the information may be presented to the user via an audio output.

The grip detection section 146 detects, based on the result of detection by the grip sensor 15, that the terminal apparatus 1 was gripped by a user, and notifies the wake-up determination section 143 of the result of the detection.

The movement detection section 147 detects, based on a change in acceleration output from the acceleration sensor 16, that the terminal apparatus 1 was lifted by a user, and the terminal apparatus 1 was put on a table and the like, and notifies the wake-up determination section 143 of the result of the detection.

The charge control section 148 controls charging of the terminal apparatus 1. Specifically, when a charge cable is connected to the charge I/F 17 and the charge cable is electrified, the charge control section 148 supplies a power to a battery (not illustrated) of the terminal apparatus 1 and charges the battery. When the battery is fully charged, the charge control section 148 ends supply of a power to the battery. Furthermore, when the charge cable is connected to the charger I/F 17, the charge control section 148 notifies the charge state monitoring section 149 of the connection. Similarly, when the charge cable is disconnected from the charge I/F 17, the charge control section 148 notifies the charge state monitoring section 149 of the disconnection.

The charge state monitoring section 149 detects start of charging of the terminal apparatus 1 and end of charging of the terminal apparatus 1. Specifically, when receiving from the charge control section 148 a notification that the charge control cable has been connected to the charge I/F 17, the charge state monitoring section 149 detects start of charging of the terminal apparatus 1, and notifies the wake-up determination section 143 of the result of the detection. Similarly, when receiving from the charge control section 148 a notification that the charge control cable has been disconnected from the charge I/F 17, the charge state monitoring section 149 detects end of charging of the terminal apparatus 1, and notifies the wake-up determination section 143 of the result of the detection.

[Method for Determining Whether User has Woken Up and Method for Determining Wake-Up Time]

Next, the following description will discuss the method for determining whether a user has woken up and a method for determining a user's wake-up time. As described above, the wake-up determination section 143 is notified by the ending operation detection section 142 that the suspending operation to suspend the output of the alarm sound and the ending operation to end the output of the alarm sound have been carried out. When receiving this notification, the wake-up determination section 143 determines that the user has woken up. Then, the wake-up determination section 143 determines, as the user's wake-up timing, timing when the wake-up determination section 143 has received the notification, i.e. timing of detecting the ending operation. Then, the wake-up determination section 143 obtains a time indicative of the timing from a timer (not illustrated), and determines the time as the user's wake-up time. The wake-up times on January 1, January 29, and February 12 in the example of FIG. 2 were specified as above and so the method by which the wake-up time was determined is recorded as "alarm ending operation".

There is a possibility that the ending operation to end the output of the alarm sound is not carried out and the output of the alarm sound is ended because time is up. In a case where the ending operation is not detected as above, the wake-up determination section 143 determines whether the user has woken up and determines the user's wake-up time based on notification from the grip detection section 146, the movement detection section 147, or the charge state monitoring section 149.

Specifically, in a case where the wake-up determination section 143 receives, from the grip detection section 146, a notification that the terminal apparatus 1 was gripped by the user, the wake-up determination section 143 determines that the user has woken up. Then, the wake-up determination section 143 determines, as the user's wake-up timing, the timing when the wake-up determination section 143 has received the notification, i.e. timing when the user gripped the terminal apparatus 1. Then, the wake-up determination section 143 obtains a time indicative of the timing from a timer (not illustrated), and determines the time as the user's wake-up time. The wake-up times on January 15 and February 5 in the example of FIG. 2 were specified as above and so the method by which the wake-up time was determined is recorded as "gripping of a terminal".

In a case where the wake-up determination section 143 receives, from the movement detection section 147, a notification that the terminal apparatus 1 was lifted by the user, the wake-up determination section 143 determines that the user has woken up. Then, the wake-up determination section 143 determines, as the user's wake-up timing, the timing when the wake-up determination section 143 has received the notification, i.e. timing when the user lifted the terminal apparatus 1. Then, the wake-up determination section 143 obtains a time indicative of the timing from a timer (not illustrated), and determines the time as the user's wake-up time. The wake-up time on January 22 in the example of FIG. 2 was specified as above and so the method by which the wake-up time was determined is recorded as "lifting of a terminal".

It is considered that it is when the user wakes up that the user places the terminal apparatus 1 on a table etc. Accordingly, in a case where the wake-up determination section 143 receives, from the movement detection section 147, a notification that the terminal apparatus 1 was placed by the user, the wake-up determination section 143 may determine, as the user's wake-up timing, the timing when the wake-up determination section 143 has received the notification, i.e. timing when the user placed the terminal apparatus 1.

In a case where the wake-up determination section 143 receives, from the charge state monitoring section 149, a notification that charging is ended, the wake-up determination section 143 determines that the user has woken up. Then, the wake-up determination section 143 determines, as the user's wake-up timing, the timing when the wake-up determination section 143 has received the notification, i.e. timing when the user disconnected the charge cable from the terminal apparatus 1. Then, the wake-up determination section 143 obtains a time indicative of the timing from a timer (not illustrated), and determines the time as the user's wake-up time. The wake-up time on January 8 in the example of FIG. 2 was specified as above and so the method by which the wake-up time was determined is recorded as "end of charging".

It is considered that it is when the user wakes up that the user connects the charge cable to the terminal apparatus 1. Accordingly, in a case where the wake-up determination section 143 receives, from the charge state monitoring section 149, a notification that charging has started, the wake-up determination section 143 may determine, as the user's wake-up timing, the timing when the wake-up determination section 143 has received the notification, i.e. timing when the user connected the charge cable to the terminal apparatus 1.

[Method for Specifying Normal Wake-Up Time]

Next, the following description will discuss a method for specifying a normal wake-up time of a user. The wake-up custom management section 144 classifies user's past wake-up times into a plurality of reference times, and determines, as a normal wake-up time of the user, a reference time into which the largest number of user's past wake-up times are classified. Specifically, the wake-up custom management section 144 classifies the user's wake-up times stored in the wake-up custom DB 121 in increments of 15 minutes with respect to each day of the week.

For example, in a case of using the records in FIG. 2, the wake-up custom management section 144 classifies 7:05 which is the wake-up time on January 1 into 7:00 which is the reference time closest to this wake-up time. Similarly, the wake-up custom management section 144 classifies the wake-up time on January 8 into 8:00, the wake-up time on January 15 into 7:00, the wake-up time on January 22 into 8:00, the wake-up time on January 29, into 7:00, the wake-up time on February 5 into 8:00, and the wake-up time on February 12 into 7:00. As a result, the wake-up custom management section 144 specifies, as the user's normal wake-up time, 7:00 which is the reference time into which the largest number of wake-up times are classified.

When specifying the user's normal wake-up time, the wake-up custom management section 144 may weigh the records such that the weight of a newer record is larger than the weight of an older record. This is because there is a possibility that a user's custom changes. Furthermore, since it is considered that reliability etc. of a wake-up time varies depending on the determination method by which the wake-up time was determined, the record may be weighed depending on the determination method.

For example, assume a case where points of individual reference times are calculated and the reference time with the largest points is determined as a normal wake-up time. In that case, the wake-up time determined based on the operation to end an alarm may be given larger points than the wake-up times determined based on other determination methods. Furthermore, the records of last month may be weighed to have smaller points than the records of this month.

Specifically, the points of individual reference times may be calculated based on setting of points and weights as follows.

The determination method is "operation to end an alarm": 10 points

The determination method is "lifting of a terminal": 7 points

The determination method is "gripping of a terminal": 5 points

The determination method is "end of charging": 5 points

Weight of point of old record: ×0.8 per elapse of 1 month (4 weeks)

Weight of point of record within 4 weeks: 1.0

Based on this setting, the points of individual reference times at the time point of February 19 were calculated from the records in FIG. 2. The result shows that the point of 7:00 is 0.8×(10+5)+1.0×(10+10)=32 points, and the point of 8:00 is 0.8×5+1.0×(7+5)=16 points. Accordingly, 7:00 with the largest points is specified as the normal wake-up time.

It is preferable to calculate the normal wake-up time by the above method. However, the normal wake-up time may be calculated by other method. For example, an average of past wake-up times may be determined as the normal wake-up time. However, in this case, if the record includes a wake-up time significantly distant from the normal wake-up time, there is a possibility that the calculated normal wake-up time has an error due to the influence of the record. For this reason, in the case of using the average, it is desirable to calculate an average of the records, for example, after removing the earliest wake-up time and the latest wake-up time from the records.

[Flow of Process]

Figure 4:
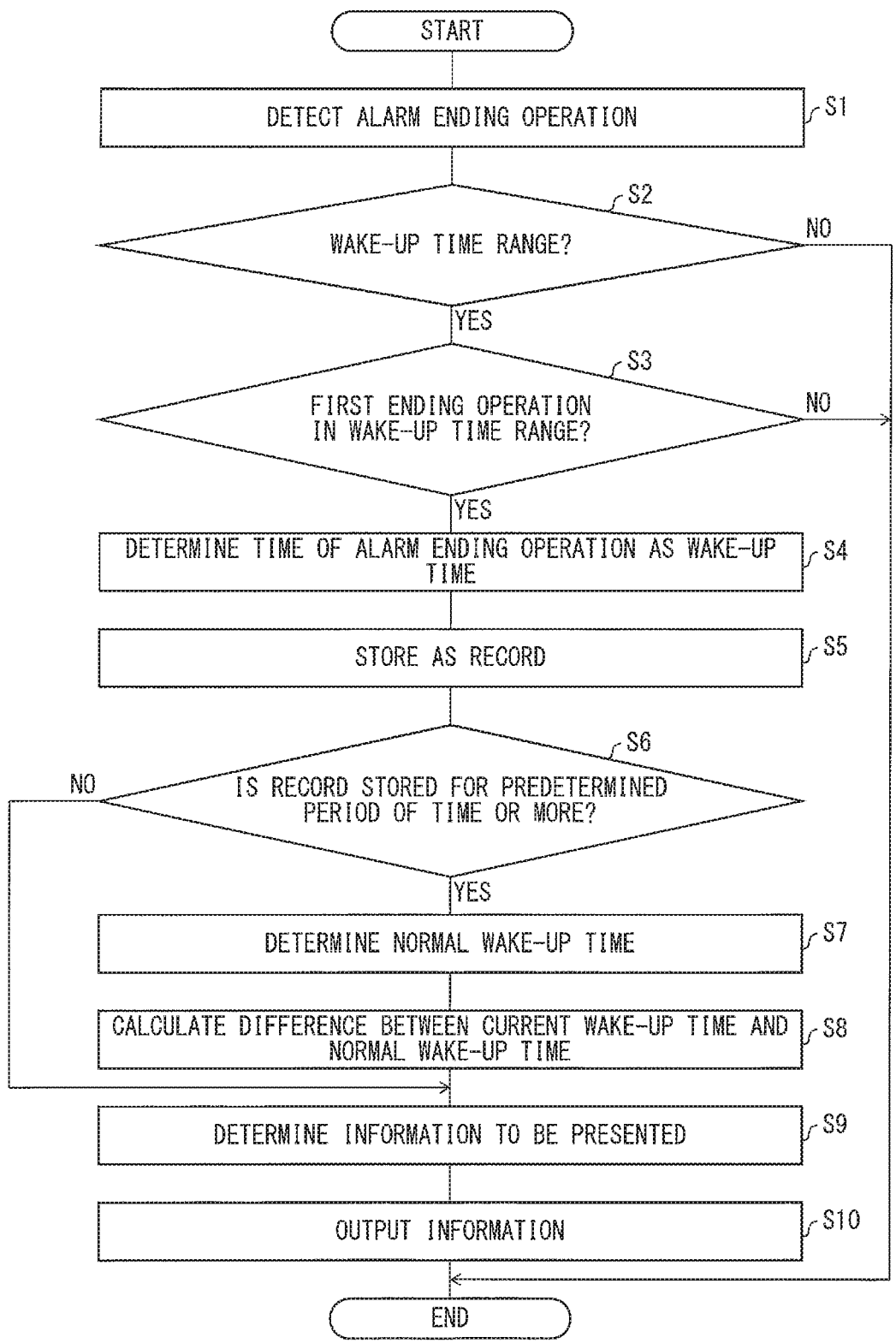
FIG. 4 is a flowchart illustrating an example of a process carried out by the terminal apparatus.

Next, the following description will discuss a flow of a process carried out by the terminal apparatus 1 (a method for controlling an information processing apparatus) with reference to FIG. 4. FIG. 4 is a flowchart illustrating an example of the process carried out by the terminal apparatus 1. This process is carried out when the information presentation process section 14 presents information to a user.

When presenting information to the user, the information presentation process section 145 instructs the wake-up determination section 143 to determine whether the user has woken up. The wake-up determination section 143 thus instructed asks the ending operation detection section 142 whether the ending operation detection section 142 has detected the ending operation.

In a case where the ending operation detection section 142 asked by the wake-up determination section 143 as above detects the operation to end an alarm (S1, operation detecting step), the ending operation detection section 142 notifies the wake-up determination section 143 of the detection. Next, the wake-up determination section 143 determines whether the current time is within a predetermined wake-up time range (e.g. a range of 5:00 to 10:00) (S2).

In a case where the wake-up determination section 143 determines in S2 that the current time is not within the wake-up time range (NO in S2), it is considered that the user has set the alarm not for waking up the user (not as an alarm clock). Accordingly, in this case, the wake-up determination section 143 notifies the information presentation process section 145 that the current time is not within the wake-up time range, and ends the process. In this case, the information presentation process section 145 does not present information to the user. On the other hand, in a case where the wake-up determination section 143 determines that the current time is within the wake-up time range (YES in S2), the wake-up determination section 143 determines whether the ending operation detected in S1 is a first ending operation within the wake-up time range (S3).

In a case where the wake-up determination section 143 determines in S3 that the ending operation is a second or subsequent ending operation (NO in S3), the wake-up determination section 143 notifies the notification presentation process section 145 of the determination, and ends the process. Also in this case, the information presentation process section 145 does not present information. On the other hand, in a case where the wake-up determination section 143 determines that the ending operation is a first ending operation (YES in S3), the wake-up determination section 143 determines that the time when the operation to end an alarm was detected is a user's wake-up time (S4, wake-up determination step), and notifies the wake-up custom management section 144 and the information presentation process section 145 of the determined wake-up time.

Then, the wake-up custom management section 144 causes the wake-up time of which the wake-up custom management section 144 was notified to be stored in the wake-up custom DB 121 as a record of the user's wake-up time (S5). Instead of the wake-up time itself, a reference time closest to the wake-up time may be stored. Furthermore, as shown in the example of FIG. 2, the wake-up time may be stored in such a manner that the wake-up time is associated with information indicative of the determination method by which the wake-up time was determined.

Then, the wake-up custom management section 144 determines whether records during a predetermined period of time or more are stored in the wake-up custom DB 121 (S6). The predetermined period of time may be a period of time which is sufficiently long to obtain a normal wake-up time, and may be, for example, 1 week. In a case where the wake-up custom management section 144 determines that records during the predetermined period of time or more are not stored (NO in S6), the wake-up custom management section 144 notifies the information presentation process section 145 of the determination, and the process proceeds to S9. On the other hand, in a case where the wake-up custom management section 144 determines that records during the predetermined period of time or more are stored (YES in S6), the wake-up custom management section 144 determines the normal wake-up time with use of the stored records. How to determine the normal wake-up time has been described above. Timing to determine the normal wake-up time is not limited to the example in the drawing, and may be determined in advance.

Then, the wake-up custom management section 144 calculates a difference between the current wake-up time determined in S4 and the normal wake-up time determined in S7 (S8), and notifies the information presentation process section 145 of the calculated difference. Thus, the process proceeds to S9.

In S9, the information presentation process section 145 determines information to be presented to the user (S9). Specifically, in a case where the information presentation process section 145 was notified of the difference between the current wake-up time and the normal wake-up time, the information presentation process section 145 refers to the presentation target specifying information 122 and determines that information corresponding to the difference of which the information presentation process section 145 was notified is to be presented to the user. On the other hand, in a case where the information presentation process section 145 was not notified of the difference between the current wake-up time and the normal wake-up time, the information presentation process section 145 determines that predetermined information is to be presented to the user. For example, the information presentation process section 145 may determine that presentation information in the presentation target specifying information 122 in FIG. 3 which information is for a case where a difference between the wake-up time on the day and the normal wake-up time is less than 15 minutes is to be presented to the user, or may prepare in advance information corresponding to such a situation.

Then, the information presentation process section 145 causes the display section 13 to output information determined as above (S10), and ends the process. For convenience of explanation, FIG. 4 shows a case where the ending operation was detected. In a case where the alarm ending operation was not detected, the user's wake-up time is determined by other determination method. In a case where the user's wake-up time cannot be determined also by other determination method, presentation of information to the user is stopped. Accordingly, for example, in a case where an alarm is mistakenly set on a holiday, if the user keeps sleeping while the alarm untouched, information is not presented to the user. This makes it possible to avoid a situation that notification of information disturbs the user's sleep or a situation that presented information is overlooked by the user.

Embodiment 2

The following description will discuss another embodiment of the present invention with reference to FIG. 5. FIG. 5 is a view schematically illustrating a wake-up time determination system 5 in accordance with Embodiment 2. The wake-up time determination system 5 is realization of the functions of the terminal apparatus 1 in accordance with Embodiment 1 with use of a client-server system, and includes a terminal apparatus 2 and a server (information processing apparatus) 3.

The terminal apparatus 2 is different from the terminal apparatus 1 in accordance with Embodiment 1 in that the terminal apparatus 2 does not include the wake-up determination section 143, the wake-up custom management section 144, and the information presentation process section 145 (see FIG. 1), and the wake-up custom DB 121 and the presentation target specifying information 122 are not stored in the terminal apparatus 2. Instead, these process sections are provided in the server 3 which is communicable with the terminal apparatus 2, and these information are stored in a storage section of the server 3. Furthermore, the server 3 includes an ending operation detection section for detecting that an operation to end an alarm was made in the terminal apparatus 2.

As illustrated in FIG. 5, in the wake-up time determination system 5, when an operation to end an alarm was made in the terminal apparatus 2, an ending operation detection section 142 of the terminal apparatus 2 detects the ending operation, and notifies the server 3 that the ending operation was made. Upon reception of the notification, the ending operation detection section of the server 3 detects that the ending operation was made, and notifies the wake-up determination section 143 of the detection. Thereafter, similarly with Embodiment 1, in the server 3, the wake-up determination section 143 specifies a wake-up time, the wake-up custom management section 144 specifies a normal wake-up time, and the information presentation process section 145 specifies information corresponding to the wake-up time and the normal wake-up time. Then, the information presentation process section 145 transmits the specified information to the terminal apparatus 2 and causes the terminal apparatus 2 to output the information, so that the information is presented to a user.

The terminal apparatus 2 may notify the server 3 of the results of detection by a grip detection section 146, a movement detection section 147, and a charge state monitoring section 149. This makes it possible for the server 3 to specify the user's wake-up time even if the ending operation is not detected. The wake-up time determination system 5 is not limited in configuration to the above example, and may be arranged such that the functions of the server 3 are distributed among a plurality of servers. For example, a system including, instead of the server 3, a wake-up time determination server for determining a user's wake-up time and an information-providing server for causing the terminal apparatus 2 to display information corresponding to the user's wake-up time can realize functions similar to those of the wake-up time determination system 5.

Embodiment 3

In the above embodiments, a description was made as to examples in which timing when an operation to end an alarm was detected is determined as user's wake-up timing. Alternatively, timing when an operation to suspend an alarm was detected may be determined as user's wake-up timing. That is, embodiments obtained by replacing "ending operation" with "suspending operation" in each of Embodiments 1 and 2 are also encompassed in the claimed invention.

In these embodiments, there may be a case where the suspending operation is detected plural times before an alarm output is ended by the ending operation or a time for the alarm output is up. In such a case, timing when the suspending operation is detected for the first time may be determined as user's wake-up timing. This is because the user is supposed to awake at a time point where the user makes the suspending operation. Alternatively, in such a case, timing when the suspending operation is detected for the last time may be determined as user's wake-up timing. In this configuration, timing when the user awakens and starts to make activity can be determined as user's wake-up timing.

Modifications

In Embodiment 1, a description was made as to an example in which the terminal apparatus 1 having an alarm (notification) function determines user's wake-up timing. Alternatively, a notification apparatus having an alarm function and a determination apparatus (information processing apparatus) for determining user's wake-up timing may be separate apparatuses. In this case, the determination apparatus communicates with, for example, the notification apparatus so as to detect that an ending operation was made to the notification apparatus.

In the above embodiments, a description was made as to examples in which information is presented to a user at timing when the user wakes up. However, a process carried out at the user's wake-up timing is not limited to the above examples as long as the process is sufficiently significant to be carried out when the user wakes up. For example, the process may be a process in which the terminal apparatus 1 arranged to have a function of remotely controlling other apparatus causes the other apparatus to operate with use of the function (e.g. causes a television to turn on, causes an air conditioner to start to operate).

Furthermore, timing when the process is carried out is not necessarily required to be completely in line with user's wake-up timing as long as the timing when the process is carried out is determined based on the user's wake-up timing. For example, the process may be carried out a predetermined time after the user's wake-up timing, or may be triggered by a user's predetermined operation. Specifically, when a user makes a predetermined operation, information indicative of records of user's wake-up times may be displayed. Such information can be used for user's health care.

In the above embodiments, a description was made as to examples in which a message corresponding to the normal wake-up time and the user's wake-up time on the day is presented to a user who has woken up. However, the content of the message and timing to present the message are not limited to these examples. For example, in a case where the user woke up later by a predetermined time or more than the normal wake-up time, a message for urging the user to go to bed at an earlier time is presented at that night. Alternatively, a message corresponding to the normal wake-up time is presented without considering the user's wake-up time on the day. For example, a bedtime which secures a predetermined sleeping time may be calculated in consideration of the normal wake-up time on the next day, and a message for urging the user to go to bed at that bedtime may be presented to the user. Furthermore, for example, the normal wake-up time on the next day may be presented to the user so that the user recognizes a wake-up time on the next day. In this case, asking may be made to the alarm control section 141 and, when it is confirmed that an alarm is not set within a wake-up time range on the next day, a message for urging the user to set an alarm may be presented. An example of such a message is "You will wake up at 7:00 tomorrow, won't you? Alarm is not set. Is it OK?"

Furthermore, a process corresponding to (i) related information related to a user other than the normal wake-up time and (ii) a wake-up time on the day may be performed. For example, information indicative of a user's schedule may be obtained as related information and a message corresponding to the schedule and the wake-up time may be presented. Specifically, when a time difference between a time when a user will go out and the wake-up time is less than a predetermined period of time, a message indicating that the time when the user will go out is impending may be presented. Furthermore, for example, a message corresponding to a difference between a time when the alarm was suspended and a time when the alarm was ended may be presented. Specifically, when a period of time from the time when the alarm was suspended to the time when the alarm was ended is longer than a predetermined period of time, there may be presented a message corresponding to a situation that it takes a long time for a user to wake up after an alarm sound has started to be output, e.g. a message which recommends an earlier bedtime to the user, a message which warns the user not to leave things behind, etc.

The "suspending operation" in the above embodiments may be any operation as long as the operation temporarily suspends notification by an alarm. For example, an operation on a predetermined key (which may be a physical key or a software key) may be detected as the suspending operation. Alternatively, an operation (motion) to grip the terminal apparatus 1, an operation (motion) to move the terminal apparatus 1, or an operation (motion) to end charging of the terminal apparatus 1 may be detected as the suspending operation. The same can be said about the "ending operation".

Referential Example

In the above embodiments, in a case where the ending operation is not detected, wake-up timing is determined based on the result of detection of a user's predetermined motion such as gripping of the terminal apparatus 1. Alternatively, only a predetermined operation is detected without detecting the ending operation. For example, user's wake-up timing may be determined by any determination method and information corresponding to the timing and the normal wake-up time may be presented.

In the above embodiments, user's wake-up timing (wake-up time) is determined. Alternatively, whether a user has woken up or not may be determined. That is, before performing a predetermined process, it may be determined whether a user has woken up or not, and based on the result of the determination, whether to perform the process or not may be determined or the content of the process may be changed.

[Example Realized with Use of Software]

Control blocks (the ending operation detection section 142, the wake-up determination section 143, the wake-up custom management section 144, the information presentation process section 145, the grip detection section 146, the movement detection section 147, and the charge state monitoring section 149 in particular) of the terminal apparatus 1 and the server 3 can be realized by a logic circuit (hardware) provided in an integrated circuit (IC chip) or the like or can be alternatively realized by software as executed by a central processing unit (CPU).

In the latter case, the terminal apparatus 1 and the server 3 each include a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

SUMMARY

An information processing apparatus (terminal apparatus 1/server 3) in accordance with aspect 1 of the present invention includes an operation detection section (ending operation detection section 142) for detecting that, with respect to a notification apparatus (terminal apparatus 1) which has been notifying a user of arrival of a preset time, an operation to stop notification by the notification apparatus has been made; and a wake-up determination section (143) for determining, as wake-up timing of the user, timing when the operation detection section detects that the operation has been made.

According to the above aspect, it is detected that the operation to stop the notification by the notification apparatus has been made, and the timing of the detection is determined as the wake-up timing of the user. In general, a user who has been awoken by notification by a notification apparatus stops the notification and shortly thereafter wakes up. Therefore, according to the above aspect, it is possible to determine the wake-up timing of the user with high accuracy. In the above aspect, the "operation to stop notification" to be detected may be a suspending operation to temporarily stop notification or may be an ending operation to end notification.

The information processing apparatus in accordance with aspect 2 of the present invention may be an arrangement of the aspect 1, further comprising a process performing section (information presentation process section 145) for performing a predetermined process at the wake-up timing of the user which is determined by the wake-up determination section or at timing determined based on the wake-up timing of the user.

According to the above aspect, a predetermined process is performed at the determined wake-up timing or at the timing determined based on the wake-up timing. This makes it possible to perform, at appropriate timing, a process for a user who has woken up. The process to be performed is not particularly limited as long as the process is related to a user who has woken up.

The information processing apparatus in accordance with aspect 3 of the present invention may be an arrangement of the aspect 2, wherein the process performing section obtains related information related to the user, and performs a process corresponding to the related information.

According to the above aspect, related information related to a user is obtained and a process corresponding to the related information is performed. That is, according to the above aspect, since a process corresponding to the related information and the wake-up timing is performed, it is possible to perform a process suitable for the user at appropriate timing corresponding to the wake-up timing of the user.

The information processing apparatus in accordance with aspect 4 of the present invention may be an arrangement of the aspect 3, further comprising a normal time determination section (wake-up custom management section 144) for determining a normal wake-up time of the user based on records of times when the operation detection section detected, in a past, the operation to stop the notification by the notification apparatus, the process performing section obtaining, as the related information, the normal wake-up time of the user which is determined by the normal time determination section.

According to the above aspect, the normal wake-up time of the user is determined based on records of times when the operation to stop the notification by the notification apparatus was detected in the past, and the normal wake-up time of the user is obtained as the related information. This makes it possible to perform a process corresponding to the normal wake-up time of the user and actual wake-up timing of the user.

The information processing apparatus in accordance with aspect 5 of the present invention may be an arrangement of the aspect 4, wherein the normal time determination section classifies, into a plurality of reference times, times when the operation detection section detected, in a past, the operation to stop the notification by the notification apparatus, and the normal time determination section determines, as the normal wake-up time of the user, a reference time into which a largest number of the times have been classified.

According to the above aspect, it is possible to determine, as the normal wake-up time of the user, a time which is less distant from the wake-up timing determined by the wake-up determination section, as compared to a case where an average of times when the operation to stop the notification by the notification apparatus was detected in the past is determined as the normal wake-up time of the user. This is because an average of wake-up times can be greatly distant from actual wake-up timing due to the influence of an outlier. The outlier here indicates a wake-up time greatly distant from a normal wake-up time. For example, assume a case where a time when notification will be made is erroneously set on a holiday. In that case, since a user is not required to wake up at the time when notification will be made, it is expected that the user will be late in making the operation to stop notification by the notification apparatus. The time when the operation to stop notification by the notification apparatus is made, which time is delayed (or made earlier) due to an irregular situation, will be an outlier distant from user's actual standard wake-up time.

The information processing apparatus in accordance with aspect 6 of the present invention is an arrangement of the aspect 4 or 5, wherein the process performing section performs a process of presenting, to the user, information which varies depending on a difference between the wake-up timing of the user which is determined by the wake-up determination section and the normal wake-up time of the user which is determined by the normal time determination section.

According to the above aspect, information which varies depending on a difference between the wake-up timing of the user which is determined by the wake-up determination section and the normal wake-up time of the user which is determined by the normal time determination section is presented to the user. This makes it possible to present information depending on the user's situation. For example, different information respectively corresponding to a situation where the user wakes up later than the normal wake-up time, a situation where the user wakes up at substantially the same time as the normal wake-up time, and a situation where the user wakes up earlier than the standard wake-up time, can be presented to the user.

The information processing apparatus in accordance with aspect 7 of the present invention is an arrangement of the aspects 1 through 6, wherein in a case where the operation detection section has detected plural times a suspending operation to suspend the notification by the notification apparatus before the notification apparatus ends the notification, the wake-up determination section determines, as the wake-up timing of the user, timing when the operation detection section has lastly detected the suspending operation.

Some of general notification apparatuses have a function of resuming notification if the suspending operation to suspend the notification has been once made but the ending operation to end the notification has not been made (or until the time is up), so as to prevent a user from falling into sleep again (snooze function). According to the above aspect, in a case where the suspending operation to suspend the notification was detected plural times, the timing when the suspending operation was detected lastly is determined as wake-up timing. Normally, a user starts to make activity at a time when notification is ended. Accordingly, the above aspect makes it possible to determine, as the wake-up timing, timing when the user awakens and starts to make activity.

The information processing apparatus in accordance with aspect 8 of the present invention is an arrangement of aspects 1 through 7, further comprising a motion detection section (grip detection section 146, movement detection section 147, charge state monitoring section 149) for detecting that the user has made a predetermined motion on the notification apparatus, in a case where the operation detection section has not detected the operation to stop the notification by the notification apparatus, the wake-up determination section determines, as the wake-up timing of the user, timing when the motion detection section has detected the predetermined motion.

According to the above aspect, in a case where the operation to stop the notification by the notification apparatus has not been detected, timing when it has been detected that the user has made the predetermined motion is determined as the wake-up timing of the user. Accordingly, even if the user has not made the operation to stop the notification by the notification apparatus when the user has woken up, it is possible to determine the wake-up timing of the user. The predetermined motion may be any motion as long as it is a motion made by a user when the user wakes up. For example, the predetermined motion may be moving a notification apparatus or gripping the notification apparatus. In a case where the notification apparatus is a chargeable apparatus, the predetermined motion may be disconnecting a charge cable etc.

A method in accordance with aspect 9 of the present invention for controlling an information processing apparatus includes the steps of: (i) detecting that, with respect to a notification apparatus which has been notifying a user of arrival of a preset time, an operation to stop notification by the notification apparatus has been made (S1); and (ii) determining, as wake-up timing of the user, timing when it is detected in the step (i) that the operation has been made (S4). This yields operations and effects similar to those of the image processing apparatus in accordance with aspect 1.

The information processing apparatuses in accordance with the aspects of the present invention may be realized by a computer. In this case, a control program for an information processing apparatus which program realizes the information processing apparatus with use of a computer by causing the computer to function as sections of the information processing apparatus, and a computer-readable storage medium in which the control program is stored, are also encompassed in the present invention.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

The present invention is applicable to an apparatus which performs a predetermined process at a predetermined time, and the like.

REFERENCE SIGNS LIST

1 Terminal apparatus (information processing apparatus)
142 Ending operation detection section (operation detection section)
143 Wake-up determination section
144 Wake-up custom management section (normal time determination section)
145 Information presentation process section (process performing section)
146 Grip detection section (motion detection section)
147 Movement detection section (motion detection section)
149 Charge state monitoring section (motion detection section)
3 Server (information processing apparatus)

The invention claimed is:

1. A terminal apparatus, comprising:
a control section including a processor and a memory; and
the processor:
  detecting that, with respect to a notification apparatus which has been notifying a user of arrival of a preset time, an operation to stop notification by the notification apparatus has been made,
  determining, when detecting that the operation to stop notification has been made, a time of the detection as a wake-up timing of the user,
  storing, as a record in the memory, corresponding wake-up timing of the user for each time the processor detecting the operation to stop notification has been made,
  determining whether records stored in the memory for a predetermined period of time or more,
  in a case where the records have been determined as being stored for the predetermined period of time or more, determining a normal wake-up time of the user from the records, and
  performing a predetermined process according to the normal wake-up time at the wake-up timing of the user or at a timing determined based on the wake-up timing of the user.

2. The terminal apparatus as set forth in claim 1, wherein the processor classifies, into a plurality of reference times, times when the processor detected, in a past, the operation to stop the notification by the notification apparatus, and the processor determines, as the normal wake-up time of the user, a reference time into which a largest number of the times have been classified.

3. The terminal apparatus as set forth in claim 1, wherein the processor performs a process of presenting, to the user, information which varies depending on a difference between the wake-up timing of the user which is determined by the processor and the normal wake-up time of the user.

4. The terminal apparatus as set forth in claim 1, wherein in a case a suspending operation to suspend the notification by the notification apparatus has been detected plural times before the notification apparatus ends the notification, the processor determines, when last detecting the suspending operation, a time of the detection as the wake-up timing of the user.

5. The terminal apparatus as set forth in claim 1, the processor being further configured to detect that the user has made a predetermined motion on the notification apparatus,
in a case where the operation to stop the notification by the notification apparatus has not been detected, the processor determines, when detecting the predetermined motion, a time of the detection as the wake-up timing of the user.

6. A method for controlling a terminal apparatus, said method comprising the steps of:
(i) detecting that, with respect to a notification apparatus which has been notifying a user of arrival of a preset time, an operation to stop notification by the notification apparatus has been made;
(ii) determining, when detecting that the operation to stop notification has been made, a time of the detection as wake-up timing of the user;
(iii) storing, as a record in the memory, corresponding wake-up timing of the user for each time the processor detecting the operation to stop notification has been made,
(iv) determining whether records stored in the memory for a predetermined period of time or more,
(v) in a case where the records have been determined as being stored for the predetermined period of time or more in the step (iv), determining a normal wake-up time of the user from the records; and
(vi) performing a predetermined process according to the normal wake-up time determined in the step (v) at the wake-up timing of the user which wake-up timing has been determined in the step (ii) or at a timing determined based on the wake-up timing of the user.

7. A non-transitory computer-readable recording medium storing a control program, the control program causing the computer to execute the steps (i) through (v) recited in claim 6.

8. A server configured to:
detect that, with respect to a notification apparatus which has been notifying a user of arrival of a preset time, an operation to stop notification by the notification apparatus has been made;
determine, when detecting that the operation to stop notification has been made, a time of the detection as a wake-up timing of the user;
storing, as a record in the memory, corresponding wake-up timing of the user for each time the processor detecting the operation to stop notification has been made,
determining whether records stored in the memory for a predetermined period of time or more,
in a case where the records have been determined as being stored for during the predetermined period of time or more, determine a normal wake-up time of the user from the records; and
perform a predetermined process according to the normal wake-up time at the wake-up timing of the user or at a timing determined based on the wake-up timing of the user.

* * * * *